J. L. WHITING.

BRUSHES.

No. 7,846. Reissued Aug. 14, 1877.

Witnesses:

Henry Chadbourn

F. Allen.

Inventor:

John L. Whiting by Alban Andrein.

his atty.

N. PETERS, PHOTO-LITHOGRAPHER, WASHINGTON, D. C.

UNITED STATES PATENT OFFICE.

JOHN LAKE WHITING, OF BOSTON, MASSACHUSETTS.

IMPROVEMENT IN BRUSHES.

Specification forming part of Letters Patent No. 109,084, dated November 8, 1870; Reissue No. 7,846, dated August 14, 1877; application filed July 16, 1877.

*To all whom it may concern:*

Be it known that I, JOHN LAKE WHITING, of Boston, in the county of Suffolk and State of Massachusetts, have invented certain new and useful Improvements in Brushes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
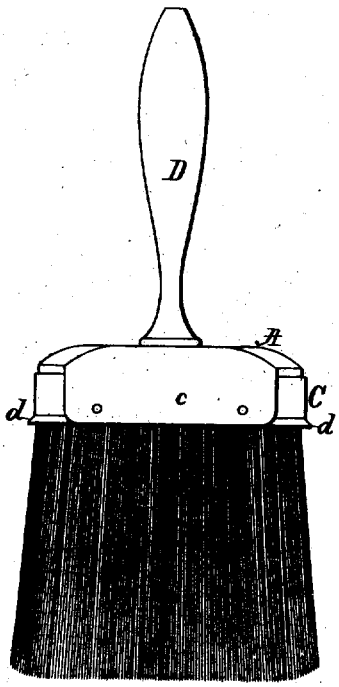
Figure 2:
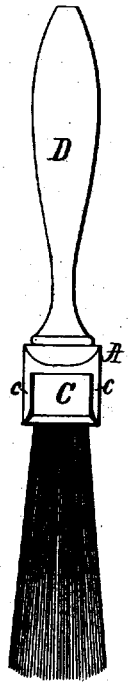
Figure 4:
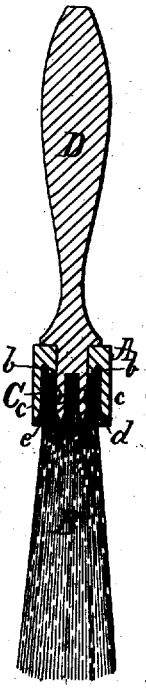
Figure 3:
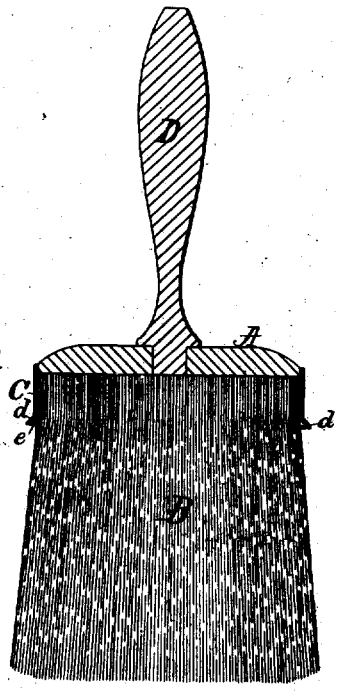
Figure 5:
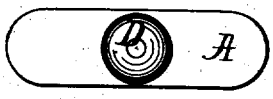
Figure 6:
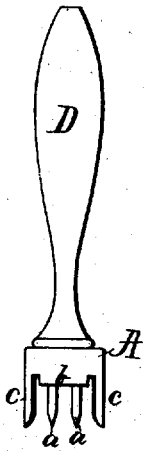
Figure 7:
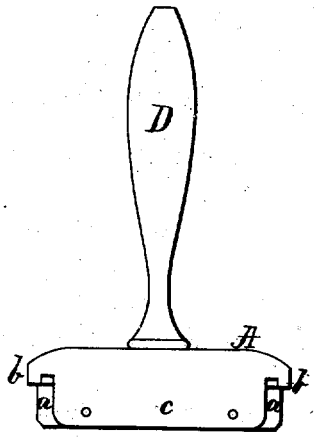

On the drawings, Figure 1 denotes a side elevation, Fig. 2 an end view, Fig. 3 a longitudinal section, and Fig. 4 a transverse section, of a brush containing my invention. Fig. 5 is a top view, Fig. 6 an end view, and Fig. 7 a side elevation, of the stock as separated from the ferrule and mass of bristles.

In such drawings, A denotes the stock or bristle-supporting body of the brush; B, the mass of bristles; C, the ferrule, and D the handle, the latter being projected from the stock at its middle.

The brush, as shown, is what is usually termed a "flat tool or brush," it being of the character of the ordinary whitewash-brush.

The stock, besides being constituted with one, two, or any other suitable number of wedged or other proper-shaped projections, *a a*, to extend into the mass of bristles, and also with a shoulder or shoulders, *b*, to enter the ferrule, is made with two broad lips, *c c*, projecting from it, and extending up and against the ferrule on its opposite sides, in manner as represented in the drawing. Through the said lips, the ferrule, and the mass of bristles, rivets or screws may be extended to fasten the whole together.

Furthermore, the ferrule is formed with a trumpet or flaring mouth, as shown at *d d*, such serving to constitute a channel, *e*, around the bristles, and to prevent them, while the brush may be in use, from being borne against the edge of the ferrule and cut or injured thereby; but this is not essential.

The channel serves, also, to catch and arrest any paint or liquid which, after running down on the bristles, would be likely to run upon the stock and drop from it while the brush may be in use.

The lips *c c* support the ferrule, and prevent it, under the strains to which it may be subjected, from working off the shoulder and loosening the bristles.

The said lips *c c* serve only as an additional support for the ferrule C, and they are not indispensable for all kinds of brushes of this nature, as, when making the shoulders *b b* and the ferrule C a little longer, I am enabled to produce a brush of sufficient strength and support without the need of the additional supporting-lips *c c*.

The bristles are to be secured in the ferrule, and against one another and the parts of the body with which they may be in contact, by cement.

I make no claim to any device, combination, or arrangement of devices as set forth and represented in either of the United States Patents No. 41,060, granted to James W. Davis, January 5, 1864, and No. 67,726, granted to J. S. Costello, August 13, 1867.

I claim in the above-described brush the following—that is to say:

1. The stock as made with the shoulder *b* and the lips *c c*, arranged as described.
2. The stock as made with the lips *c c* and one or more projections, *a*, to enter the bristles, as described.
3. The stock as made with the lips *c c*, the shoulder *b*, and one or more projections, *a*, arranged as described.
4. The brush as made with the lips *c c* and the ferrule C, arranged with the stock A and bristles B, as set forth.
5. The brush as made with the lips *c c* and one or more projections, *a*, arranged with its stock A and ferrule C, as described.
6. The stock or head A as made with one or more projections, *a a*, shoulders *b b*, and ferrule C, as set forth.
7. The brush as made with one or more projections, *a a*, shoulders *b b*, ferrule C, and bristles B, as set forth.

In testimony that I claim the foregoing I have hereunto set my hand this 13th day of July, 1877.

JOHN LAKE WHITING.

Witnesses:

ALBAN ANDRÉN,
HENRY CHADBOURN.